Figure 1:
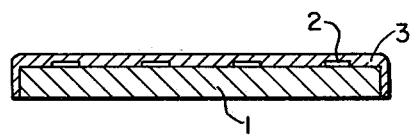

United States Patent [19]

Becker et al.

[11] 4,443,392
[45] Apr. 17, 1984

[54] PROCESS FOR THE PRODUCTION OF MOLDED DECORATIVE ARTICLES FROM A HARDENABLE SUBSTANCE BASED ON THERMOSETTING SYNTHETIC RESIN

[75] Inventors: Josef Becker, Neunkirchen-Seelscheid; Manfred Simon, Niederkassel; Karl-Heinz Spiess, Much; Richard Weiss, Troisdorf, all of Fed. Rep. of Germany

[73] Assignee: Dynamit Nobel Aktiengesellschaft, Troisdorf, Fed. Rep. of Germany

[21] Appl. No.: 317,845

[22] Filed: Nov. 3, 1981

[30] Foreign Application Priority Data

Nov. 6, 1980 [DE] Fed. Rep. of Germany ....... 3041794

[51] Int. Cl.³ .............................................. C04B 41/10
[52] U.S. Cl. ..................................... 264/25; 264/132; 264/133; 264/DIG. 31
[58] Field of Search ............... 264/112, 122, 123, 132, 264/133, 255, 256, DIG. 31, DIG. 57, 25

[56] References Cited

U.S. PATENT DOCUMENTS 2,022,587  11/1935  Cunningham .................. 264/132 X

FOREIGN PATENT DOCUMENTS 1778109  9/1971  Fed. Rep. of Germany .
1729550  10/1971  Fed. Rep. of Germany .
2416017  11/1974  Fed. Rep. of Germany .
1357110  2/1964  France .
2206426  6/1974  France .
2259070  8/1975  France .
2372028  11/1976  France .

Primary Examiner—Thomas P. Pavelko
Attorney, Agent, or Firm—Antonelli, Terry & Wands

[57] ABSTRACT

A process for the production of decorated molded articles wherein a base article is produced by casting and/or compression molding from a hardenable substance containing a minor amount of a thermosetting synthetic resin and a hardener therefor, and a major amount of at least one inert filler, and, optionally, accelerators, colorants and other auxiliary materials and by providing the article with a surface layer of hardenable lacquer resin.

24 Claims, 2 Drawing Figures

PROCESS FOR THE PRODUCTION OF MOLDED DECORATIVE ARTICLES FROM A HARDENABLE SUBSTANCE BASED ON THERMOSETTING SYNTHETIC RESIN

This invention relates to a process for the production of molded decorative articles having patterns or designs wherein a base article is produced from a hardenable substance containing duroplastics, i.e., thermosets, and respectively hardeners or, in combination with inorganic hardening systems, inert fillers and, if need be, accelerators, colorants and other auxiliary materials by compression molding and, if need be, furnished with a surface layer composed of a hardenable lacquer resin, and to the molded article produced by this process.

Tiles or panels for floor and wall coverings which are composed of crushed stoneware and ceramic chips bonded with polyester or epoxide resin are known from the French Pat. No. 21 26 538. By the addition of organic pigments, these plates can also be produced with penetrating colorants.

Laminates for decorative laminated panels are known from DE-OS 26 33 711 where the back of the panel is coated with a layer composed of an inert filler, a non-thermoplastic adhesive and a water-soluble thermosetting resin in the form of urea formaldehyde or melamine formaldehyde condensates.

For some time synthetic resin-containing concrete has been known which is composed of a mixture of dried aggregate such as quartz gravel, quartz sand, quartz powder and a binder based on unsaturated polyesters, hardeners and accelerators and if need be, an addition of styrene, wherein mixtures with aggregate to binder ratios of between 8:1 to 12:1 are customary. There have also been efforts to produce single or double-layered decorative panels from a substance based on unsaturated polyester resins or polymethacrylate and fillers, to which reference is made to DE-AS 21 55 232.

In such known synthetic resin stones or synthetic resinous concrete and prefabricated parts produced therefrom, limits are set on the type of pattern to be provided by the corresponding coloration of the substances to be hardened.

This application forms the basis of an effort to create a cost-effective procedure for the production of molded decorative articles based on hardenable plastics with corresponding mineral fillers whereby unusual and numerous patterns, such as those known to the ceramic industry, should be possible.

The known production of ceramic molded articles such as panels and tiles is extremely energy-intensive and time-consuming.

The energy requirement begins with the drying of the clay minerals and proceeds to the drying, for example, of the extrusion molded panels and eventually to the actual baking process; even the designing or in any case the final glaze still requires extremely high temperatures for long periods of time.

The necessary temperatures lie between 80° to 100° C. for the drying of the molded piece and up to 1200° C. for firing. Holding periods of hours to days are required for this treatment.

For these baking processes, very large and costly chamber kilns, annular kilns or tunnel kilns are employed.

Previous ceramic imitations based on plastic or even plastic laminates with different bases were usually and thus were not satisfactory with regard to design and most of all with respect to physical characteristics. This was serious, for example, in connection with the abrasion qualities, whereby these products, for example, could not be used as floor panels.

Proceeding from the known processes this invention performs the task of producing ceramic-like molded articles using plastic by combining the following procedures:

(a) producing a non caking pourable substance comprising 3 to 7% by weight of a hardenable plastic preferably 2 to 4% by weight 0 to 3% by weight of calzium stearate, zinc stearate are stearic acid 0 to 5% by weight of water, alcohol or mixtures therefrom being solutions for the hardenable plastic 97 to 85% by weight preferably 96 to 87% by weight of fillers such as quartz, sand, chalk, heavy spar, corundum, slag, basaltic powder, aluminium hydroxides etc or mixtures thereof (b) casting the substance into a mold and pressing with a specific pressure of about 100 to 500 kp/cm$^2$, preferably 200 to 400 kp/cm$^2$ to a shaped base article (c) extracting the base article from the mold;

(d) as necessary, hardening of the extracted base article at elevated temperatures preferably up to 150° C.;

(e) applying a design-forming or decorative layer comprised of a hardenable lacquer or paint containing colorant on at least one part of a surface of the base article;

(f) drying and hardening of the design-forming layer and, if need be, of the still unhardened base article at elevated temperatures, preferably up to 150° C.;

(g) eventually applying a synthetic glaze comprised of a hardenable resinous compound to the design-forming layer; and (h) hardening the synthetic glaze.

According to the process of this invention, ceramic-like molded articles based on plastics and mineral fillers can be produced which not only come close to stoneware ceramics in capacity to take design and pattern but also their mechanical values, especially strength values, abrasion values and weather resistance, but even surpass stoneware ceramics in many properties. This cost-effective, i.e., energy-conserving, procedure is to be viewed as the primary advantage of the ceramic-like molded article which is produced according to the procedure of this invention. Also of great importance are the ease of implementing the process steps and the relatively small number of steps for obtaining the desired product.

A special advantage of the molded article produced according to this invention is the great flexural strength; thus the thickness of the material can be less than that of stoneware. The flexural strength of the basic article after hardening amounts to at least 35 N/mm$^2$ of a plate with a thickness of 5 mm and increases with the thickness of the plates. Accordingly, along with material savings, a savings in weight is ensured at the same time. Should the molded article, however, be produced according to the procedure in this invention in the same thickness as the corresponding ceramic part, then the molded article produced according to this invention would exhibit greater strength. This can especially be used to advantage if molded articles of larger dimensions are to be produced which offer greater safety in operations during production and in later use.

In principle, three process stages are provided for the production of the ceramic-like molded articles according to this invention, i.e., the production of the base article, the decorating of the base article and the application of the synthetic glaze, i.e., the abrasion-resistant coating. The decorating layer and abrasion-resistant coating can in some cases be the same.

For the base article, almost all duroplastics, i.e., thermoset synthetic resins, can be used which can be compounded to an extremely high degree with quartz sand and other mineral fillers and, if need be, pigments. For pigmenting the substance for the basic article 0 to 6% by weight of inorganic and/or organic pigments or dyestuffs are used. Polyester resins, polymethacrylates and epoxide resins with corresponding use of hardeners and accelerators and, if need be, other auxiliary materials are used especially advantageously as hardenable duroplastics. The above-mentioned duroplastics have the advantage that to a large degree they can be filled with any filler and thereby permit problem-free processing. Especially the production of the base article in open molds by pouring the mass in, thickening and, if need be, pressing off is possible, as well as the hardening at relatively low temperatures, i.e., requiring little energy, and even at room temperature.

Another group of hardenable duroplastics which come into consideration for the production of the base article is condensation resins such as melamine resins, urea formaldehyde resins, phenol formaldehyde resins or mixtures thereof. The condensation resins can also be greatly supplemented by fillers. These resins can also be combined with inorganic binders, among others.

The hardenable duroplastic mixture which is used as organic binder for the base article has a different composition, depending on the plastic, i.e., synthetic resin, utilized in each case.

Preferred when using unsaturated polyester resins, i.e. phtalic acids, acelarinic acid ester, sebacin acid ester, with unsaturated alcohols or unsaturated dicarbonacic, are:

- 96 to 98% by weight of unsaturated polyester resin and
- 3 to 1% by weight of catalyst (hardener), e.g., peroxide, i.e. bensoyl peroxide and
- 2 to 1% by weight of accelerator, e.g. heavy metals, i.e., cobaltoctoat and
- if need be, other auxiliary materials such as wetting agents, stabilizers, colorants, etc.

When using acrylate resins, i.e., polyacrylates or polymethacrylates, or prepolymers of polyester-, polyurethane- and epoxy-acrylates or -methacrylates or mixtures therefrom the hardenable mixture comprises:

- 90 to 95% by weight of acrylate resin, and
- 10 to 5% by weight of hardener (peroxides), or electron beams with 2 to 8 Mrad and
- if need be, other auxiliary materials also.

When using polyurethanes, the hardenable mixture can contain:

- 30 to 80% by weight of polyethers or polyalcohols,
- 70 to 20% by weight of isocyanates, i.e. toluenediisocyanate, para-diisocyanate, diphenylmethane isocyanate, hexamethylene diisocyanate, aromatic and aliphatic isocyanates.

When using epoxide resins, a hardenable mixture can be used comprised of:

- 50 to 90% by weight of epoxy resin,
- 50 to 10% by weight of amines, polyamines or polyamidoamines.

When using condensation resin, the following compositions are preferably chosen:

- 96 to 100% by weight of condensation resins such as melamine resin and/or phenol formaldehyde resins and are urea formaldehyde
- 0 to 4% by weight of hardener such as ammonium chloride, hydrochloric acid.

For all these hardenable plastic compositions the cited percentages by weights preferentially refer to specific resins and hardener types, and other optimum weight ratios may be selected depending on the resin and hardener combination.

The preferred mineral fillers are quartz sand, chalk, heavy spar, corundum, slag, basalt, aluminum hydroxide and mixtures thereof. However, it is also possible to have as filler other dry fillers such as marble granulate, perlite, light expanded clay aggregate and, if need be, also crushed form additives such as acrylate foam, polyethylene foam, polyvinylchloride foam, polyurethane foam, phenol resin foam, polyester foam, etc. The consistence of the filler is preferred powdery and/or small granules less than 0.5 mm.

Due to economic considerations, the proportion of hardenable duroplastic in the base article should be as low as possible; however, there is a bottom limit of about 3% by weight of hardenable resin compound relative to the filler. With the procedure of this invention, base articles can be produced with sufficient strength, for example for application as wall tiles or floor tiles with thicknesses beginning at 2 mm. As a rule, the upper limit of the thickness of the molded article in this invention in foreseeable areas of application is 30 mm.

An essential feature of the invention is the processing and use of a non caking pourable substance, which is useful to fill the molds quickly and exactly. The non-caking pourable substance further has the advantage that after pressing to the shaped article, the pressed shaped article can be extracted easily from the mold without being hardened and this not hardened shaped article can easily be handled and further designed. Thus the molds can easily be emptied and quickly filled with new substances, whereby the processing costs are low.

According to a preferred detail of the invention the non caking pourable substance comprises 2 to 4% by weight of condensation resins, 1 to 2% by weight of calcium stearate, zinc stearat or stearic acid, 1 to 5% by weight of water, alcohol, i.e. ethanol, isopropanol, or mixtures therefrom as solution for the condensation resins, 96 to 89% by weight of fillers with granules smaller than 0.5 mm being homogeneously mixed, dried to a humidity content of 1 to 3, preferably 1.5 to 2% by elevated temperatures between 50° to 80° C. and then being screened with a screen less than 0.8 mm.

In order to be able to produce the ceramic-like molded article in any repeatable pattern with the procedure of this invention, the capacity of the base article to take designs and the applicable design-forming process as well as the colorant or toner is of special significance. Whether it is possible to solid-dye the basic object by appropriate pigmentation or, if need be, in a marbled pattern, the essential design-forming step is in the application of a design containing a colorant to at least one part of the surface of the base article, either to an already hardened base article or an unhardened article. For one or more applications of the design-forming layer, known processes can be used, particularly spraying, stamping, serigraphy, dripping, casting, immersion or also a combination of these processes. For example, in an initial process step in the serigraphic process a colored film can be applied and after drying a second lacquer color can be point-sprayed onto it. This effects a pattern by means of puddling, i.e., formation of islands of color. It is also possible to select toners whose pigmentation and viscosity are so calibrated that after the application of the lacquer layer, the color pigments float onto the basic object and in this manner produce an appropriate color variation. Also, mixture effects with several toners and stutter sprayings, etc., can be used so as to achieve appropriate color designs.

In principle, all known lacquers can be used for the production of the design-forming layer on the base article; in this process not only inorganic but also organic colorants can be employed for pigmentation. It is advantageous that for the procedure of this invention, no requirement is made regarding the high temperature resistance of the colorant. This is in contrast to the coloring and designing of ceramic molded articles where the pigments must be adapted to and withstand the subsequent baking procedures. It is simple therefore to use colorants with low temperature resistance, up to 200° C., for the procedure of this invention because of the relative low curing or hardening temperatures required for the design-forming layer and/or the glaze layer.

For the toners 100%, i.e., solvent-free lacquers, are usable, as are also lacquers which exhibit a solid content of only 5% and otherwise contain solvents. The lacquer viscosities which are to be adjusted are governed solely by the desired effect and the requirements of the application process. Usual lacquer viscosities lie between Fora 4-ASTM from 15 to 220 seconds efflux time. Wet application weights of the toner for the process of this invention are intended to be, as required by each design-forming layer, between 5 g/m$^2$ and 200 g/m$^2$.

The toners can be structured in their composition in such a way that they are dry physically or are chemically or radiation-hardenable. To name a few, which could be used as binding systems for the lacquers: polyvinylalcohol, polymethylmethacrylate, polyvinylchloride, unsaturated polyesters, epoxide resins, acrylates, urea, melamine, alkyd resins.

Suitable colorants are not only inorganic but also organic pigments and soluble organic dyestuffs.

The solvents to be considered for the toners, if need be, are: water, alcohols, esters, ketones, aromatics, chlorinated hydrocarbons, glycols, etc.

Another feature essential to this invention for the production of ceramic-like molded articles using hardenable plastics heavily loaded with mineral fillers is the production of a synthetic glaze which corresponds to the glaze available for ceramics. The synthetic glaze in this invention is required to produce sufficient hardness and mar resistance, chemical resistance and, if need be, weather resistance and to render rational manufacturing possible. The degree of lustre of the synthetic glaze varies from highly polished to matt. The synthetic glaze can thus be accordingly structured.

In a process for the production of synthetic resins with a lacquer overlay, this lacquer overlay is first put into the mold, then the synthetic stone or synthetic concrete is poured into the mold. The procedure of this invention concerning the design formation of the surface of the molded article takes a fully different direction. Of particular use as the synthetic glaze for the process of this invention are hardenable resin compounds using acrylates, methacrylates, polyurethanes, polythiol/system/polydiene in the polythiole) or organopolysiloxanes and, if need be, mixtures thereof. Depending on the type of synthetic glaze, these can be either solvent-free or contain solvent. This is also governed by the amount and type of application of the synthetic glaze upon the designed based article. Particularly recommended for the application of the synthetic glaze are casting, dipping, pressing, rolling and spraying, when the application weights of the synthetic glaze between 20 to 150 g/m$^2$ are preferred. Radiation hardening of resin compositions is preferred for the synthetic glaze because of the relatively short hardening time. For UV-radiation 80 W/cm for a time of 1 to 3 seconds is employed preferably. Hardening systems using not only UV radiation but also electron beams can be employed here. For electron beams 2 to 8 Mrad are preferably employed.

As an example, overlays which can be hardened by UV radiation, also with matting effect as described in detail in DE-OS 30 06 960, can be utilized for the process of this invention for the production of ceramic-like molded articles.

Synthetic glaze overlays using acrylic resins have the following composition:
   10 to 60% by weight of acrylates, methacrylates, modified acrylic resins,
   90 to 10% by weight of solvent, such as toluene, methylisobutylketone,
   0 to 30% by weight of hardener, such as isocyanates or peroxides.

For synthetic glaze overlays using modified acrylates, compositions of, e.g.:
   100 parts by weight of epoxyacrylate,
   200 parts by weight of tetraoxethylated trimethylolpropantriacrylate,
   100 parts by weight of hexandioldiacrylate,
   10 parts by weight of dimethyl ketal, etc. can be used.

The process of this invention provides many advantages for the production of ceramic-like molded articles, e.g., for wall or floor panels, particularly in an embodiment wherein the pourable substance for forming the base article contains only 3 to 7% by weight of the duroplastic binder. For this, a base article comprised of a pourable substance containing a relatively small amount of a hardenable duroplastic is produced, compacted and then hardened at relatively low temperatures, e.g., 20° to 150° C. The hardening time is between 2 to 180 minutes and is also governed by the thickness of the base material. It is possible to harden in two steps, first with lower temperature at about 50° to 80° C. than at higher temperature at 130° to 140° C. Also advantageous is the fact that, because of the low hardening temperatures, very little energy is consumed and, moreover, no great temperature resistance is required of the materials used for the base article. Then the article is provided with a decorative colored layer; then the lacquer layer is applied and also dried and hardened at relatively low temperatures. This hardening is governed by the toner system used; air drying toner systems are preferred. Subsequently the synthetic glaze comprised of a hardening resin compound is applied. Radiation-hardenable resin compounds using acrylates or modified acrylates are preferably used. They can be hardened in a relatively short time using UV radiation or also electron beams. The molded articles with pattern and glaze produced in this manner exhibit great abrasion resistance, great strength and, due to the portions of resin in its makeup, a certain flexural strength which makes it superior to normal ceramic articles. Compositions hereinafter disclosed can be selected as hardenable plastic for the base material.

According to another feature of the invention there may be provided non-caking pourable substances in different colours which can be poured simultaneously or one after the other into the mold via a template and then pressed to the shaped article. This way a designed shaped article can be produced in one way.

The addition of a small amount of calcium stearate, zinc stearate or stearinic acid to the base substance has the advantage to close in a non expected way the open cell structure of the hardened shaped article. Therefore a shaped article containing some small amount of the above mentioned materials is not so porous and does not need so much hardenable lacquer for design or glazing since the penetration of the lacquer is stopped partially.

Another especially advantageous embodiment on the procedure of this invention works with very small portions of hardenable duroplastic in the base article, i.e., 3 to 7% by weight, and 96–89% by weight of the filler, thus resulting in a very cost-effective product; in addition, it offers the capability to extract the base article cold prior to curing and to cure without a mold.

This type of process in different embodiments has the great advantage that the molds necessary for the production of the base article are recycled very quickly into the production process and also are not withdrawn from the production process during the relatively long holding time for curing. With the procedure of this invention and the material composition selected for the base article, it is therefore possible to extract the still uncured base article, but not before it exhibits sufficient rigidity and strength to avoid crumbling. This procedure is based on the use of a still pourable substance for the base article for filling the mold. This procedure can also be modified so that the decorating step is undertaken not after the curing of the base article but rather before its curing. In any case, the toner in the colorant-containing material, depending upon its composition, can penetrate into the still porous base article, thus achieving more than just superficial color application. Moreover, depending upon the composition of the toner and the selected colors, in addition to the mechanical penetration of the toner into the pores of the base article material, there is also migration of the colorant out of the toner into the base article or its plastic components and consequently another similar penetration dying process occurs. Preferred compositions for the hardenable plastic for this procedure include:

(A) 96–98% by weight unsaturated polyester resin
3–1% by weight of hardener (peroxide) and
2–1% by weight of accelerator; (heavy metal accelerator)

(B) 30–80% by weight of polyether or polyalcohol, and
70–20% by weight of isocyanate hardener;

(C) 90–95% by weight of polyacrylate or polymethacrylate, and
10–5% by weight of hardener, e.g., a peroxide;

(D) 50–90% by weight of epoxide resin,
50–10% by weight of amines, polyamidoamines, or polyamines, (E) 96 to 100% by weight of condensation resin,
0–4% by weight of hardener i.e. paratolyol sulfonacid, acid hardenable, alcoli hardenable systems.

In the case, plastic hardener and accelerator mixtures are usually utilized, and with special resins water can be added for increased substance fluidity.

Essential for the previous procedures using cold extraction of the still uncured base article from the mold is the pressing of the article at a certain specified pressure, i.e., 100 to 500 $kp/cm^2$. For the pressing a press plunger can be used, for example, with, if need be, an embossed surface, thus making it possible to produce an embossed surface on the base article with compression molding. In this manner, it is possible to produce slatelike structures or even other structures on the molded articles, e.g., panels.

The following example illustrates the above-mentioned process embodiment with which a panel is producible with slatelike appearance for use on the floor, wall, facade or roof.

EXAMPLE 1

The following materials are mixed in a Henschel mixer, poured into a mold and pressed; in doing so, a slatelike structure is imprinted onto the surface of the panel-like base article:

337 parts by weight of basaltic powder
300 parts by weight of quartz sand 0.3 to 0.7 mm $\phi$
300 parts by weight of ground power plant slag
53 parts by weight of unsaturated polyester resin (Leguval N 50 from Bayer AG) 0.5 part by weight of cobaltochoate accelerator (1% solution in styrol)
1.0 parts by weight of methylethyl ketone peroxide.

The specific pressure during the pressing of the base article is 350 $kp/cm^2$. The base article is extracted after the pressing and then placed in an 80° C. warming tunnel and cured there for 45 minutes. The cured base article can be designed now or be given a synthetic glaze immediately. Both sides are, for example, sprayed and, after drying and curing of the synthetic glaze, packaged. The following composition is chosen for the glaze for this example:

30 parts by weight of polymethyl methacrylate (Degalan LP 64/12 from Degussa)
3.5 parts by weight of citric acid
0.2 part by weight of silicone oil
25 parts by weight of methylethyl ketone
25 parts by weight of toluene
15.3 parts by weight of xylene
2.0 parts by weight of Aerosil as matting agent.

With the process of this invention, panels among other things can be produced for floor and wall coverings instead of ceramic tiles. The panel dimensions can be from 20×20 to 100×100 cm and have any known shape such as quadratic, square, triangular, sextagonal, oval, etc.

Another advantageous embodiment for the production of designed ceramic-like molded articles using hardenable plastics with an abrasion-resistant glaze-like surface can be produced, wherein two different pourable substances are sequentially placed in a mold, according to this invention. Particularly in this case a decorative design treatment can be obtained for the base article by differently colored and differently inserted masses, which are pressed to the panel-shaped base article in sequence and subsequently cured. If this process is used, the decorative treatment is practically handled as part of the base article production although in sequential process steps so that another design surface can be applied and only the final synthetic glaze must be applied.

However, it is also possible to pour variously colored hardenable substances for the base article simultaneously into a mold, over a template for example, and then press it. In this manner, as relates to overall design, repeatable but patterned molded articles are producible.

With the procedure of this invention, it is possible to produce especially profitable ceramic-like molded articles such as panels for floor, wall and roof coverings, utensils such as pots, plates and vases, flower boxes, window sills, decorative panels, table surfaces, bath tubs, wash basins, roof tiles, etc.

With this invention it is possible to provide various decorative molded articles formed of a hardenable substance using duroplastic materials with hardeners or in combination with inorganic hardening systems, inert fillers, as well as, if need be, accelerators, colorants and other auxiliary materials and a surface layer formed of a hardenable lacquer resin which is characterized by the fact that a decorative surface is furnished upon at least one part of the surface of a molded and hardened base article formed of a mass containing 3 to 7% by weight of hardenable plastic and 97 to 85% by weight of fillers such as quartz sand, chalk, heavy spar, corundum, slag, etc. or mixtures thereof as well as, if need be, colorants using a lacquer containing colorants and that the base article is overlaid entirely or at least in the decorative surface area with a layer of hardened, transparent synthetic resin.

For the coloring of the base article substance, special use is made of inorganic metalloxide pigments such as titanium oxide, iron oxide, chrom oxide as well as carbon black and also organic colorants.

Figure 2:
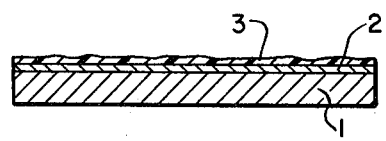

The structure of a molded article in accordance with this invention is shown in the accompanying drawings wherein:

FIG. 1 is a cross-sectional view of one embodiment of a decorated article of the invention provided with a discontinuous decorative design layer; and FIG. 2 is a cross-sectional view of another embodiment of the invention showing a decorative article provided with a continuous decorative design layer.

The panel-shaped base article 1 according to FIG. 1 is furnished in part with the design layer 2, e.g., a toner, on one of its surfaces and subsequently overlaid with a synthetic glaze 3.

In the type of structure according to FIG. 2, the panel-shaped base article is continuously designed with the toner layer 2, and over this the synthetic glaze 2 is then applied.

Four more examples for the implementation of the process in this invention follow.

EXAMPLE 2

A mixture comprised of:
5 parts by weight of phenol formaldehyd resin
35 parts by weight of quartz sand 0.08 to 0.5 mm $\phi$
60 parts by weight of quartz powder 0 to 0.1 mm $\phi$
1 part by weight of calcium stearate
3 parts by weight of water-isopropanol (1:1)
is made and during 5 minutes dried to a humidity of 2% by weight by temperatures of 50° to 80° C., then screened with a screen smaller than 0.6 mm and a non caking porouble substance is received. This substance is poured into molds of 50×50 cm and pressed with a specific pressure of 400 kp/cm² to 6 mm thick plates. This plates were extracted directly from the mold and then heated in two steps of 80° C. and 140° C., each during one hour for hardening. The hardened plate has a flexural strength of 40 N/mm².

The resultant panel-shaped base article is decorated with a whirling spray system in a variegated cloud design and then dried at a temperature of 80° C. Utilized here is a toner containing:
3% by weight of acrylic resin (Degalan LP 59/03 of Degussa)
7% by weight of PVC-PVA copolymers from Lonza-Werke (PVC 80%, PVA 20%) Lonzavyl CL 4520
5% by weight of coloring pigment (Irgazin Gelb 2 GLT of Ciba-Geigy)
85% by weight of solvent, such as ethylglycolacetate or toluene or MIBK.

For the synthetic glaze, a hardenable resin compound comprised of:
100 parts by weight of urethane acrylate
100 parts by weight of tetraoxethylated trimethylol propane triacrylate
100 parts by weight of trimethylol propane triacrylate
90 parts by weight of hexandioldiacrylate
is applied to the base article by pouring and hardened using a 250 kV electron beam system with a dose of 2 mrad.

It is possible, to design the hardened shaped article in another way, as follows.

Then the panel-shaped base article thus produced is decorated using serigraphic colorants from the Marabu Firm (Maragloss GO).

A synthetic glaze of the following composition is poured onto the panels decorated in this way by a roll casting method and hardened using 2 UV lamps rated at 80 w/cm at a speed of 4 m/minute:
100 parts by weight of urethane acrylate (Ebecryl 200 from UCB Chemie, Belgique)
100 parts by weight of tetraoxethylated trimethylol propane triacrylate
100 parts by weight of trimethylol propane triacrylate
90 parts by weight of hexandioldiacrylate
20 parts by weight of photoinitiator (Darucure 1173)

Another possibility of decorating the hardened shaped article is by serigraphy where the colorant-containing lacquer forms the synthetic glaze at the same time and cured at room temperature. This lacquer has the following composition:
30 parts by weight of polymethyl methacrylate
3.5 parts by weight of citric acid ester
0.2 parts by weight of silicone oil
25 parts by weight of methyl ethyl ketone
25 parts by weight of toluene
15.3 parts by weight of xylene
2.0 parts by weight of Aerosil
5.0 parts by weight of coloring pigments and dyestuffs: red iron oxide and anthrachinon blue.

EXAMPLE 3

The following materials are homogeneously mixed, dried and screened to a non caking porouble substance, which is filled into molds and pressed with an oil hydraulic press with a specific pressure of 350 kp/cm² at room temperature to plates of 200×300×7 mm:
60 parts by weight of unsaturated polyester LEGUVAL W 41 from BAYER 1.2 parts by weight of methylene ketone peroxide 1.1 parts by weight of cobalt octanoate (1% solution in styrol)
500 parts by weight of quartz powder 0 to 0.1 mm $\phi$
440 parts by weight of quartz sand 0.05 to 0.5 mm $\phi$ The pressed plates were taken out of the mold and then hardened at 80° C. during 90 minutes. The following toner and glaze layer is applied to the panel in a roll casting process and cured by means of a 250 kV electron beam system at 2.5 mrad:

100 parts by weight of epoxy acrylate
150 parts by weight of trimethylol propane triacrylate
150 parts by weight of hexandioldiacrylate
16 parts by weight of titanium dioxide.

The resultant panel has a very smooth, highly lustrous white surface.

EXAMPLE 4

34 parts by weight of melamine resin (MADURIT VWM 3818 of HOECHST AG)
26.5 parts by weight of melamine resin (MADURIT MF 900 of HOECHST AG)
475 parts by weight of quartz sand 0.08 to 0.5 mm $\phi$
475 parts by weight of chalk (CALCILIT)

plates were pressed analogous to example 3. The plates were extracted from the molds then dried during 1 hour at 80° C. and then hardened at 140° C. during 1 hour. The hardened plates had a flexural strength of 50 N/mm$^2$ by a thickness of the plates of 7 mm. The plates were designed analogous to example 3.

EXAMPLE 5

33.4 parts by weight of melamine resin (MADURIT VMW 3318 of HOECHST)
35.8 parts by weight of phenol resin (TMMM of DYNAMIT NOBEL AG)
520 parts by weight of quartz sand 0.05–0.5 mm $\phi$
430 parts by weight of quartz powder 0 to 0.1 mm $\phi$
10 parts by weight of zinc stearate
30 parts by weight of H$_2$O/C$_2$H$_5$OH (1:1)

are mixed homogeneously, then dried to a humidity of 2% by weight, screened with a screen smaller than 0.8 mm, filled into molds and pressed with a specific pressure of 400 kp/cm$^2$ to plates of 300×300×5 mm. The plates were extracted from the molds and dried and hardened at temperatures of 80° to 100° C. during 50 minutes and then hardened at 140° C. during 1 hour. The plates can be designed according to example 2.

We claim:

1. A process for the production of decorated molded articles wherein a base article is produced by compression molding from a hardenable substance containing a minor amount of a thermosetting synthetic resin material and a major amount of at least one inert filler and by providing the article with a surface layer of hardenable lacquer resin which comprises:

(a) producing a non-caking, pourable substance from a homogenous mixture comprising 3 to 7% by weight of a hardenable plastic material, 0 to 3% by weight of calcium stearate, zinc stearate or stearic acid, 0 to 5% by weight of water, alcohol or mixtures thereof, 97 to 85% by weight preferably 96 to 87% by weight of fillers comprising quartz, sand, chalk, heavy spar, corundum, slag, basaltic powder, or aluminum hydroxides or mixtures thereof by drying said mixture to a moisture content of 1 to 3% at temperatures between 50° and 80° C.;

(b) casting the substance into a mold and pressing with a specific pressure of about 100 to 500 kp/cm$^2$ to form a shaped base article;

(c) extracting the shaped base article from the mold;

(d) hardening the extracted base article at elevated temperatures up to 150° C.;

(e) applying a design-forming decorative layer comprised of a hardenable lacquer or paint containing colorant on at least one part of a surface of the base article;

(f) drying and hardening of the design-forming layer and any still unhardened base article at elevated temperatures up to 150° C.;

(g) eventually applying a synthetic glaze comprised of a hardenable resinous compound to the design-forming layer; and (h) hardening the synthetic glaze.

2. A process according to claim 1, wherein the molded article is produced in the form of panels for floor, ceiling and ceiling coverings, utensils including pots, plates and vases, flower boxes, window sills, decorative panels, table surfaces, bath tubs, wash basins, and roof tiles.

3. A process according to claim 1, wherein said fillers are particulate materials with diameters smaller than 0.5 mm.

4. A process according to claim 1, wherein said hardenable synthetic resin comprises a polyacrylate, an unsaturated polyester resin, a polymethacrylate, a polyurethane, an epoxide resin, or mixtures thereof.

5. A process according to claim 1, wherein the hardenable synthetic resin comprises a melamine resin, an urea formaldehyde resin, a phenol-formaldehyde resin, or mixtures thereof.

6. A process according to claim 5, wherein the haredenable material for the base article contains:
    96 to 100% by weight of condensation resin,
    0 to 4% by weight of hardener, 7. A process according to claim 1, 3, 4 or 5, wherein said design-forming layer comprises a thermosetting lacquer up to 100% by weight comprised of binders, colorants and auxiliary materials which is applied at least once with a wet application weight of between 5 and 200 g/m$^2$ to the base article.

8. A process according to claim 7, wherein colorants with low temperature resistance up to 200° C. are contained in said design-forming layer.

9. A process according to claim 7, wherein the lacquer contains a hardening binder system.

10. A process according to claim 1, wherein a hardenable resin compound based on acrylate, methacrylate, polyurethane, polythiol/systems and organopolysiloxanes or mixtures thereof is used as based for the synthetic glaze.

11. A process according to claim 1, wherein the synthetic glaze is applied with an application weight of 20 to 150 g/m$^2$.

12. A process according to claim 10, wherein the resin compounds forming the glaze are hardenable by UV or electron beams.

13. A process for production of a decorated molded article containing inert filler and a hardenable synthetic resin according to claim 1, wherein the non-caking, pourable substance comprises 2 to 4% by weight of condensation resins, 1 to 2% by weight of calcium stearate, zinc stearate or stearic acid, 1 to 5% by weight of water and alcohol as solution for the condensation resins, and 96 to 89% by weight of fillers with granules smaller than 0.5 mm.

14. A process according to claim 1, wherein:
(a) a pourable substance containing 3 to 7 by weight of hardenable duroplastic based on melamine resin and/or phenol-formaldehyde resin and/or urea formaldehyde resin including hardeners and 1 to 2% by weight of calcium stearate, zinc stearate or stearic acid and 1 to 5% by weight of water or alcohol or mixtures thereof and 96 to 89% by weight of at least one filler selected from the group consisting of quartz, sand, chalk, corundum, slag, basaltic powder, heavy spar, aluminum hydroxide or mixtures thereof, is poured into a mold for a panel-shaped base article and pressed; with a specific pressure of about 100 to 500 kp/cm² being exerted; the pressed article being extracted cold from the mold, then
(b) the base article is then hardened at a temperature between 60° and 150° C. for a period of up to about 2 hours in two steps;
(c) then a lacquer-containing colorant is applied to at least one surface of the hardened base article, permitting the lacquer to penetrate into the pores of the base article;
(e) the lacquer is then dried and hardened at an elevated temperature up to 150° C.;
(f) a hardenable transparent resin compound is applied to at least one side of the base article as a glaze; and
(g) the glaze is dried and hardened at an elevated temperature or by UV or electron beams radiation.

15. A process for producing a molded article wherein:
(a) a pourable substance is formed from a mixture containing 3 to 7 by weight of hardenable duroplastic based on unsaturated polyester resin, polyacrylate, polymethacrylate, or epoxide resin and hardeners, accelerators and 93 to 97% by weight of at least one filler selected from the group consisting of quartz, sand, chalk, corundum, slag, basalt, heavy spar, aluminum hydroxide and mixtures thereof and a colorant by drying the mixture to a moisture content of 1 to 3% at temperatures of between 50° and 80° C. and the resulting pourable substance is poured and pressed into a mold to form a portion of the base article; and
(b) thereafter at least one other pourable substance of the same composition, although of another coloration than the initially introduced substance is formed as in step (a) and applied to one part of the surface of the previously formed portion of the base article and is pressed along with the base article and in each instance of pressing a specific pressure between 100 to approximately 500 kg/cm², is exerted, after which:
either
(c) the base article is hardened at a temperature between 60° and 150° C. and then
(d) the article is extracted from the mold; or
(e) the base article is extracted from the mold, and then
(f) the article is hardened at a temperature which is between 60° and 150° C.;
(g) thereafter, a hardenable transparent resin compound is applied to the base article as a glaze and
(h) the glaze is dried and hardened at an elevated temperature.

16. A process to claim 15, wherein the pourable substances of different colorations are simultaneously poured via a template into the mold for forming the base article and are pressed together to form the base article.

17. A process according to claim 16, wherein at least one part of the surface of the panel-shaped base article is structured by compression molding.

18. A process according to claim 17, wherein the hardenable duroplastic for the base article contains:
96 to 98% by weight of unsaturated polyester resin,
3 to 1% by weight of hardener for said resin, and
2 to 1% by weight of an accelerator.

19. A process according to claim 17, wherein the hardenable duroplastic for the base article contains:
30 to 80% by weight of polyether or polyalcohol, and
70 to 20% by weight of isocyanate hardener.

20. A process according to claim 17, wherein the hardenable duroplastic for the base article contains:
90 to 95% by weight of polyacrylate or polymethacylate, and
10 to 5% by weight of hardener.

21. A process according to claim 17, wherein the hardenable duroplastic for the base article contains:
50 to 90% by weight of epoxide resin,
50 to 10% by weight of amine, polyamidoamine or polyamine.

22. A process according to claim 6, wherein the glaze contains:
94 to 100% by weight of acrylate, methacrylate or modified acrylic resin, and
0 to 6% by weight of photoinitiator.

23. A process according to claim 6, wherein the glaze contains:
10 to 60% by weight of acrylic resins, modified acrylic resins or methacrylic resins,
90 to 10% by weight of solvent, and
0 to 30% by weight of hardener.

24. A process for producing a molded article wherein:
(a) a pourable substance is formed from a mixture containing 3 to 7 by weight of hardenable duroplastic based on unsaturated polyester resins, polyacrylates, polymethacrylates or epoxide resins and hardeners, accelerators and 97 to 93 by weight of at least one filler selected from the group consisting of quartz, sand, chalk, corundum, slag, basaltic powder, heavy spar, aluminum hydroxide or mixtures thereof by drying the mixture to a moisture content of 1 to 3% at temperatures of between 50° and 80° C. and the resulting pourable substance is poured into a mold for a panel-shaped base article and pressed; with a specific pressure of about 100 to 500 kp/cm² being exerted;
(b) the pressed base article is extracted cold from the mold;
(c) then a lacquer-containing colorant is applied to at least one surface of the hardened base article, permitting the lacquer to penetrate into the pores of the base article;
(d) the base article is then hardened at a temperature between 60° and 150° C. for a period of up to about 2 hours;
(e) a hardenable transparent resin compound is applied to at least one side of the base article as a glaze; and
(f) the glaze is dried and hardened at an elevated temperature.

* * * * *